United States Patent
Diet et al.

(10) Patent No.: US 9,371,506 B2
(45) Date of Patent: Jun. 21, 2016

(54) CLEANING COMPOSITION

(75) Inventors: Patrick Diet, Aubin Neufchateau (BE);
Marcel Gillis, Sarolay (BE)

(73) Assignee: Colgate-Palmolive Company, New York, NY (US)

( * ) Notice: Subject to any disclaimer, the term of this patent is extended or adjusted under 35 U.S.C. 154(b) by 0 days.

(21) Appl. No.: 14/375,469

(22) PCT Filed: Feb. 17, 2012

(86) PCT No.: PCT/US2012/025545
§ 371 (c)(1),
(2), (4) Date: Jul. 30, 2014

(87) PCT Pub. No.: WO2013/122595
PCT Pub. Date: Aug. 22, 2013

(65) Prior Publication Data
US 2015/0011448 A1    Jan. 8, 2015

(51) Int. Cl.
| | | |
|---|---|---|
| C11D 1/29 | (2006.01) | |
| C11D 3/37 | (2006.01) | |
| C11D 3/43 | (2006.01) | |
| C11D 3/30 | (2006.01) | |
| C11D 3/20 | (2006.01) | |
| C11D 3/33 | (2006.01) | |
| C03C 23/00 | (2006.01) | |
| C11D 1/12 | (2006.01) | |
| C11D 1/14 | (2006.01) | |

(52) U.S. Cl.
CPC .............. *C11D 3/30* (2013.01); *C03C 23/0075* (2013.01); *C11D 1/12* (2013.01); *C11D 1/29* (2013.01); *C11D 3/201* (2013.01); *C11D 3/2041* (2013.01); *C11D 3/2044* (2013.01); *C11D 3/2048* (2013.01); *C11D 3/2068* (2013.01); *C11D 3/2086* (2013.01); *C11D 3/33* (2013.01); *C11D 3/3723* (2013.01); *C11D 3/43* (2013.01); *C11D 1/146* (2013.01)

(58) Field of Classification Search
CPC .............. C11D 1/29; C11D 3/30; C11D 3/33; C11D 3/3723; C11D 3/201; C11D 3/2044; C11D 3/2068; C11D 3/43; B08B 3/04
USPC ......... 510/181, 182, 191, 235, 238, 432, 475, 510/477, 488, 499, 505, 506; 134/42
See application file for complete search history.

(56) References Cited

U.S. PATENT DOCUMENTS

| | | | |
|---|---|---|---|
| 4,368,146 A | | 1/1983 | Aronson et al. |
| 6,342,473 B1 * | | 1/2002 | Kott et al. ........... 510/357 |
| 6,740,627 B1 | | 5/2004 | Clarke et al. |
| 7,741,265 B2 * | | 6/2010 | Iverson et al. ........ 510/475 |
| 7,745,383 B2 * | | 6/2010 | Dreja et al. ........... 510/180 |
| 8,367,595 B2 * | | 2/2013 | Cheung et al. ........ 510/191 |
| 2009/0048143 A1 * | | 2/2009 | Iverson et al. ........ 510/476 |

FOREIGN PATENT DOCUMENTS

| | | |
|---|---|---|
| EP | 1216295 | 9/2000 |
| EP | 0980422 | 6/2005 |
| EP | 0904343 | 7/2009 |
| EP | 1945746 | 10/2010 |
| EP | 1772496 | 3/2011 |
| WO | WO 97/32958 | 9/1997 |

OTHER PUBLICATIONS

"New BASF products for use in bathroom cleaners and liquid detergents offer greater convenience", p. 1-2, Sep. 2005.*
International Search Report and the Written Opinion issued in International Application PCT/US2012/025545 mailed Aug. 31, 2012. WO.
Product News: Windex Original Glass Cleaner, Manuf: S.C. Johnson & Son, Inc. (2011).

* cited by examiner

*Primary Examiner* — Gregory R Delcotto

(57) ABSTRACT

An aqueous cleaning composition comprising a surfactant, a polyamine, and propylene glycol. The combination of the polyamine and propylene glycol will provide low residue and increased shine during wet and dry wiping and will provide anti-fog properties to a substrate after cleaning. The use of either the polyamine alone or the propylene glycol alone will not provide results meeting all three tests.

17 Claims, No Drawings

CLEANING COMPOSITION

CROSS-REFERENCE TO RELATED PATENT APPLICATIONS

The present application is a U.S. National Stage entry under 35 U.S.C. §371 of Patent Cooperation Treaty Patent Application No. PCT/US2012/25545, filed Feb. 17, 2012, the entirety of which is incorporated herein by reference.

FIELD OF THE INVENTION

The present invention relates to cleaners.

BACKGROUND OF THE INVENTION

Cleaning compositions are used to clean various substrates. After cleaning, it is desired to minimize any residue left on the substrate and to increase the shine on the substrate. This is particularly important for glass surfaces, which can show any residue. It would be desirable to design a cleaning composition that reduces residue and increases shine.

BRIEF SUMMARY OF THE INVENTION

An aqueous cleaning composition comprising a surfactant, a polyamine, and propylene glycol. Also, a method of cleaning of substrate comprising applying the cleaning composition to the substrate and wiping, optionally the substrate is glass. Also, a use of a polyamine and propylene glycol in a cleaning composition to provide shine, low residue, and anti-fog properties to a substrate cleaned with the cleaning composition.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE INVENTION

The following description of the preferred embodiment(s) is merely exemplary in nature and is in no way intended to limit the invention, its application, or uses.

An aqueous cleaning composition comprising a surfactant, a polyamine, and propylene glycol. The combination of the polyamine and propylene glycol in the cleaning composition provides shine and low residue in the wet wipe and dry wipe tests described below and provides anti-fog properties to a substrate. The combination is able to meet all three tests while compositions without either or with only one of the materials are not able to meet all three tests.

The cleaning composition can be used to clean substrates by applying the composition to the substrate and wiping the substrate. In certain embodiments, the cleaning composition is formulated to be a glass cleaner.

The composition includes a surfactant. The surfactant can be any anionic, amphoteric, or zwitterionic surfactant. In certain embodiments, the surfactant comprises an anionic surfactant.

As used throughout, the counter ion for the anionic surfactant can be a metal ion, an ammonium ion, or an amine. Metal cations that can be used include, but are not limited to, alkali metal ions and alkaline earth ions. In some embodiments, the metal cation ion can be lithium, sodium, potassium, magnesium, or calcium. In some embodiments, the amine is triethanolamine.

In one embodiment, the surfactant comprises the salt of an alkyl ether sulfate. In one embodiment, the alkyl is a C10 to C14. In one embodiment the surfactant is a sodium lauryl ether sulfate. In one embodiment, there is an average of about 1 to about 10 moles of ethylene oxide per mole. In another embodiment, there is an average of about 2 to about 3 moles of ethylene oxide per mole.

In another embodiment, the surfactant comprises a triethanolamine alkyl sulfate. In one embodiment, the alkyl is a C10 to C14 alkyl. In another embodiment the surfactant comprises a triethanolamine lauryl sulfate.

The composition can include an amine oxide surfactant. Amine oxide semi-polar nonionic surfactants can comprise compounds and mixtures of compounds having the formula:

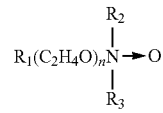

wherein $R_1$ is an alkyl, 2-hydroxyalkyl, 3-hydroxyalkyl, or 3-alkoxy-2-hydroxypropyl radical in which the alkyl and alkoxy, respectively, contain from 8 to 18 carbon atoms, $R_2$ and $R_3$ are each methyl, ethyl, propyl, isopropyl, 2-hydroxyethyl, 2-hydroxypropyl, or 3-hydroxypropyl, and n is from 0 to 10. Particularly preferred are amine oxides of the formula:

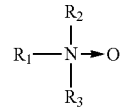

wherein $R_1$ is a $C_{12-16}$ alkyl and $R_2$ and $R_3$ are methyl or ethyl. In one embodiment the amine oxides comprise alkyl amine oxides and/or cocoamidopropyl amine oxide. In one embodiment, the ratio of anionic surfactant to amine oxide surfactant is about 3:1 to about 4:1.

In certain embodiments, the surfactant can be present in an amount of 0.05 to 1% by weight of the composition, optionally 0.05 to 0.5%, 0.05 to 0.25%, 0.1 to 0.2%, or 0.15% by weight of the composition.

The composition includes an amphoteric polyamine. A non-limiting example of an amphoteric polyamine is Sokalan™ HP70 from BASF. In certain embodiments, the amphoteric polyamine can be present in an amount of 0.005 to 0.05% by weight of the composition, optionally, 0.005 to 0.02%, 0.01 to 0.015%, or 0.012% by weight of the composition.

The composition includes propylene glycol. In certain embodiments, the propylene glycol can be present in an amount of 0.1 to 1% by weight of the composition, optionally 0.2 to 0.8%, 0.3 to 0.7%, or 0.5% by weight of the composition.

In one embodiment, the polyamine and propylene glycol are in a weight ratio of 0.005:1, optionally at a weight ratio of 0.012:0.5.

The composition is an aqueous composition. The amount of water can be any amount. The composition can be supplied as a ready to use composition. In certain embodiments, the amount of water can be greater than 90% by weight of the composition, or optionally greater than 91, greater than 92, greater than 93, or greater than 94% by weight of the composition. In certain embodiments, the amount of water is about 95% by weight of the composition.

The composition can also be supplied as a concentrate that can later be diluted with water. The composition can be at least 2, at least 3, at least 4, or at least 5 times concentrated from the above ready to use concentration, in which case, the amounts of materials are adjusted accordingly.

The composition can additionally contain a solvent. Because water and propylene glycol are already included in the composition, the term solvent refers to solvents in addition to these two materials. Examples of solvents include, but are not limited to, alkylene glycols, glycol ethers, propylene glycol n-butyl ether, propylene glycol n-propyl ether, ethylene glycol n-hexal ether, ethylene glycol n-butyl ether, dipropylene glycol methyl ether, $C_1$ to $C_6$ alkyl alcohols, methanol, ethanol, n-propanol, isopropanol, n-butyl alcohol, sec-butyl alcohol, isobutyl alcohol, tert-butyl alcohol, 1- 2- or 3-pentanol, neopentyl alcohol, hexanol, and combinations thereof. In certain embodiments, the solvent is at least one solvent chosen from propylene glycol n-butyl ether and ethanol. In certain embodiments, the solvent contains both propylene glycol n-butyl ether and ethanol. The solvent can be present in any amount. In certain embodiments, the solvent is present in an amount of 1 to 10% by weight of the composition. In other embodiments, the amount of solvent is 1 to 6%, 2 to 6%, 3 to 5%, or 4% by weight of the composition.

In certain embodiments, propylene glycol n-butyl ether is present in an amount of 1 to 3% by weight of the composition, optionally 1.5 to 2.5% or 2% by weight of the composition. In certain embodiments, ethanol is present in the composition in an amount of 1 to 3% by weight of the composition, optionally 1.5 to 2.5% or 2% by weight of the composition.

The cleaning composition can be formulated to any pH. In certain embodiments, the composition further includes ammonia or ammonium hydroxide. In certain embodiments, the ammonia or ammonium hydroxide can be present in an amount that provides a pH of 10 to 12, optionally 11.

In certain embodiments, the composition further includes an acid. Examples of acids include, but are not limited to, organic acids, inorganic acids, lactic acid, formic acid, citric acid, sorbic acid, acetic acid, glycolic acid, propanoic acid, propionic acid, oxalic acid, maleic acid, tartaric acid, adipic acid, malic acid, malonic acid, glycolic acid, and combinations thereof. In certain embodiments, the acid can be present in an amount that provides a pH of 3 to 4.

The cleaning composition may optionally contain any other additives that are used in cleaning compositions, such as colorants, fragrances, pro-fragrances, preservatives, rheology modifiers, structuring agents, hydrotropes, whitening agents, reducing agents, enzymes, enzyme stabilizing agents, builders, bleaches, photobleaches, bleach catalysts, soil release agents, dye transfer inhibitors, buffers, soil repellents, water-resistance agents, suspending agents, aesthetic agents, and combinations thereof. These materials can be used in any desired amount.

EXAMPLES

Below are non-limiting examples of the invention.

The compositions below are made by mixing of the ingredients. Formulas C1 to C3 are comparative formulations. These compositions are formulated as glass cleaners.

| Material | Ex. 1 | C1 | C2 | C3 |
|---|---|---|---|---|
| Sodium laureth sulfate | 0.15 | 0.15 | 0.15 | 0.15 |
| Polyamine (Sokalan ™ HP70) | 0.012 | 0 | 0.012 | 0 |
| Propylene glycol | 0.5 | 0 | 0 | 0.5 |
| Propylene glycol n-butyl ether | 2 | 2 | 2 | 2 |
| Ethanol | 2 | 2 | 2 | 2 |
| Water and minors | Q.S. | Q.S. | Q.S. | Q.S. |

A wet wiping test is conducted to rate the residue/shine pattern after cleaning glass mirror tiles. To a 15 cm×15 cm tile, 0.75 g of cleaning composition is applied. A tissue is attached to a mechanical cleaning arm that applies 0.8 kg of force. The tile is wiped for 15 seconds by the mechanical cleaning arm. After wiping, a dry tissue is used for a manual wipe to remove any residual cleaning composition. The tile is allowed to dry at room temperature. Each tile is evaluated by five trained panelists for residue pattern and shine. The tiles are evaluated on a scale of 1 being worst to 10 being best, and the results of the five panelists are averaged. The results are in Table 1 below.

A dry wiping test is conducted on the same tiles after the wet wiping test to simulate additional wiping after the glass is dry. A tissue is attached to the mechanical cleaning arm that applies 0.8 kg of force. The tile is wiped for 15 seconds by the mechanical cleaning arm. Each tile is evaluated by five trained panelists for residue pattern and shine. The tiles are evaluated on a scale of 1 being worst to 10 being best, and the results of the five panelists are averaged. The results are in Table 1 below.

TABLE 1

| Example | Wet wipe test | Dry wipe test |
|---|---|---|
| Ex. 1 | 7.5 | 7.7 |
| C1 | 6.1 | 6.9 |
| C2 | 6.8 | 4.5 |
| C3 | 4.7 | 5.6 |

Note, after statistical analysis in the wet wipe test, Example 1 and C2 are not significantly different from each other, and C 1 and C2 are not significantly different from each other. Example 1 is significantly different from C1 and C3. In the dry wipe test, Example 1 and C1 are not significantly different from each other. Example 1 is significantly different from C2 and C3.

In the wet wipe test, adding polyamine only did not significantly change the residue/shine rating, and adding propylene glycol only made the residue/shine worse. Adding both the propylene glycol and the polyamine significantly improved the residue/shine.

In the dry wipe test, adding propylene glycol alone or polyamine alone made the residue/shine worse.

Anti-fog test. Glass mirrors (15 cm×15 cm) are cleaned with each of the compositions using a paper towel with 2 g of composition. The mirrors are placed over a beaker of boiling water and exposed to steam for 30 seconds. The mirrors are observed for the presence or absence of mist on the mirrors. The mirror cleaned with C1 (no polyamine and no propylene glycol) had mist present on the mirror. All of the other mirrors did not have mist.

As can be seen from the tests, only Example 1 was able to meet all three tests. While the comparative compositions could meet one or two tests, only the combination with the polyamine and propylene glycol could meet all three tests.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Unless otherwise specified, all percentages and amounts expressed herein and elsewhere in the specification should be understood to refer to percentages by weight. The amounts given are based on the active weight of the material.

What is claimed is:

1. An aqueous cleaning composition comprising:
   a) 0.05 to 1% by weight of the composition of a surfactant which is a salt of a C10-C14 alkyl ether sulfate,
   b) 0.005 to 0.05% by weight of an amphoteric polyamine, and
   c) 0.1 to 1% by weight of propylene glycol.

2. The cleaning composition of claim 1, wherein the surfactant is sodium laureth sulfate.

3. The cleaning composition of claim 1, wherein the surfactant is present in an amount of 0.05 to 0.5% by weight of the composition.

4. The cleaning composition of claim 1, wherein the amphoteric polyamine is present in an amount of 0.01 to 0.02% by weight of the composition.

5. The cleaning composition of claim 1 further comprising a solvent selected from propylene glycol n-butyl ether or ethanol.

6. The cleaning composition of claim 1, wherein the composition comprises:
   a) sodium laureth sulfate,
   b) the amphoteric polyamine,
   c) the propylene glycol,
   d) propylene glycol n-butyl ether, and
   e) ethanol.

7. The cleaning composition of claim 5, wherein propylene glycol n-butyl ether is present in an amount of 1 to 3% by weight of the composition.

8. The cleaning composition of claim 5, wherein ethanol is present in the composition in an amount of 1 to 3% by weight of the composition.

9. The cleaning composition of claim 1, wherein the composition further comprises ammonia or ammonium hydroxide.

10. The cleaning composition of claim 1, wherein the composition further comprises an acid.

11. The cleaning composition of claim 10, wherein the acid comprises lactic acid.

12. The cleaning composition of claim 1, wherein the cleaning composition is a glass cleaner.

13. The cleaning composition of claim 1, wherein the amphoteric polyamine and propylene glycol are present in a weight ratio of 0.005:1.

14. A method of cleaning a substrate comprising applying the cleaning composition of claim 1 to the substrate and wiping.

15. The cleaning composition of claim 1, wherein the composition comprises:
   a) sodium laureth sulfate,
   b) 0.005 to 0.05% by weight of the composition of the amphoteric polyamine,
   c) 0.1 to 1% by weight of the composition of the propylene glycol,
   d) 1 to 3% by weight of the composition of propylene glycol n-butyl ether, and
   e) 1 to 3% by weight of the composition of ethanol.

16. The cleaning composition of claim 15, wherein the amphoteric polyamine and propylene glycol are present in a weight ratio of 0.005:1.

17. An aqueous cleaning composition comprising
   a) 0.05 to 1% by weight of sodium laureth sulfate,
   b) 0.01 to 0.02% by weight of an amphoteric polyamine, and
   c) 0.3 to 0.7% by weight of propylene glycol.

* * * * *